M. S. BLAIR.
Harrow.
No. 224,813. Patented Feb. 24, 1880.
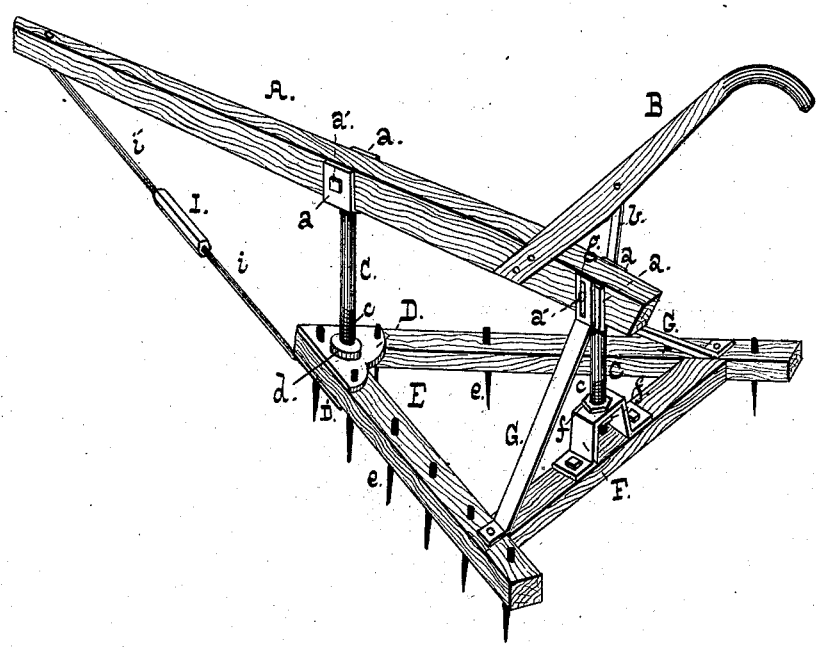
Witnesses,
W. A. Bertram
L. H. Barclay
Inventor,
MILTON S. BLAIR
by
R. D. Williams
Attorney.

UNITED STATES PATENT OFFICE.

MILTON S. BLAIR, OF WARSAW, IOWA.

HARROW.

SPECIFICATION forming part of Letters Patent No. 224,813, dated February 24, 1880.

Application filed November 28, 1879.

*To all whom it may concern:*

Be it known that I, MILTON S. BLAIR, of Warsaw, Wayne county, State of Iowa, have invented certain new and useful Improvements in Harrows; and I hereby declare the same to be fully, clearly, and exactly described as follows, reference being had to the accompanying drawing, in which the device is illustrated in perspective view.

My invention relates in particular to corn-harrows; and it consists in certain improvements upon the device described in Letters Patent of the United States granted to me July 1, 1879, No. 216,933. In that patent is shown a pair of small triangular harrows attached to an ordinary cultivator-frame and adapted to be drawn between the rows of corn.

As my present invention relates only to certain features of the harrows, I have considered it unnecessary to illustrate in the accompanying drawing more than a single harrow embodying my present improvements, which latter relate mainly to the attachments of the draft-beam, having for their objects to secure a maximum range of adjustment of the beam to suit varying heights of cultivator-axles, together with great strength, lightness, and facility for effecting the adjustment of the beam.

In the accompanying drawings, A is the beam, which is provided at its forward end with a suitable clevis or clip for attaching it to the cultivator-axle, and rests in jaws $a\,a$ on the upper ends of standards C C, where it is secured by means of bolts $a'\,a'$.

B is a handle similar to that of a plow, one being bolted to the beam of each harrow, and one of them being bent around, so that the driver guides both harrows while walking in the path of one of them. $b$ is a brace for the handle.

E is the harrow, having teeth $e$ of any desired shape. On its forward point is bolted a plate, D, which is furnished with a perforated and internally-threaded boss, $d$, into which the end $c$ of the forward standard, C, is screwed.

F is a stirrup bolted to the cross-timber of the harrow. Through a hole in its top the end $c$ of the rear standard passes, and is secured in place by nuts $f\,f$ above and below the stirrup.

G G are lateral braces bolted to the harrow-frame, and slotted at $g$ for the passage of the bolt $a'$.

Rods $i\,i'$ serve to brace the beam A, the former being bolted to the harrow-point and the latter passing through the beam.

I is a nut, which is right and left threaded internally, and is adapted to draw the correspondingly-threaded ends of the rods $i\,i'$ together.

In order to adjust the beam to any desired height, the bolt $a'$ is taken out and the forward standard is raised or lowered, as may be desired, by screwing it into or out of the boss $d$. The rear standard is adjusted by means of the nuts $f\,f$, as will be readily understood. Either adjustment is, of course, independent of the other, and when but a slight elevation or depression of the end of the beam is desired but one need be employed.

The nut I and rods $i\,i'$ serve to deliver the draft directly upon the harrow, and prevent the standards from being strained or bent while clamping the beam securely upon them.

Beneath the point of the harrow is a plate, D', similar to the upper plate, D, between which plates the sides of the harrow are clamped.

What I claim is—

1. A harrow adapted, as set forth, for attachment to a cultivator-frame, and provided with a draft-beam mounted on standards which are vertically adjustable upon the harrow, as described.

2. The harrow E, having plate D and stirrup F, in combination with the standards C, having threaded lower ends, and adapted for vertical adjustment, substantially as described.

MILTON S. BLAIR.

Witnesses:
Z. DOUBLE,
WM. G. LYON.